(12) United States Patent
Aissi et al.

(10) Patent No.: US 7,788,494 B2
(45) Date of Patent: Aug. 31, 2010

(54) LINK KEY INJECTION MECHANISM FOR PERSONAL AREA NETWORKS

(75) Inventors: Selim Aissi, Beaverton, OR (US); Uma M. Gadamsetty, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1075 days.

(21) Appl. No.: 11/168,603

(22) Filed: Jun. 28, 2005

(65) Prior Publication Data

US 2006/0291663 A1  Dec. 28, 2006

(51) Int. Cl.
*H04L 9/32* (2006.01)
(52) U.S. Cl. .................................... 713/171; 380/283
(58) Field of Classification Search .................. None
See application file for complete search history.

(56) References Cited

U.S. PATENT DOCUMENTS

| | | | |
|---|---|---|---|
| 7,123,878 B1* | 10/2006 | Heinonen et al. | 455/41.2 |
| 2001/0016909 A1* | 8/2001 | Gehrmann | 713/171 |
| 2002/0173295 A1* | 11/2002 | Nykanen et al. | 455/414 |
| 2003/0014372 A1* | 1/2003 | Wheeler et al. | 705/71 |
| 2003/0018495 A1* | 1/2003 | Sussman | 705/2 |
| 2003/0065918 A1* | 4/2003 | Willey | 713/168 |
| 2004/0083368 A1* | 4/2004 | Gehrmann | 713/171 |
| 2004/0109441 A1* | 6/2004 | Hur et al. | 370/352 |
| 2004/0124966 A1* | 7/2004 | Forrest | 340/5.8 |
| 2004/0128509 A1* | 7/2004 | Gehrmann | 713/171 |
| 2005/0021968 A1* | 1/2005 | Zimmer et al. | 713/176 |
| 2005/0058294 A1* | 3/2005 | Chen et al. | 380/277 |
| 2005/0226175 A1* | 10/2005 | Gupta et al. | 370/310 |
| 2005/0235141 A1* | 10/2005 | Ibrahim et al. | 713/164 |
| 2006/0053302 A1* | 3/2006 | Yasaki et al. | 713/183 |
| 2006/0095772 A1* | 5/2006 | Bell et al. | 713/171 |
| 2006/0133604 A1* | 6/2006 | Buer et al. | 380/28 |
| 2006/0198448 A1* | 9/2006 | Aissi et al. | 375/259 |
| 2008/0320587 A1* | 12/2008 | Vauclair et al. | 726/17 |

OTHER PUBLICATIONS

Fleming et al., Architectural Overview of Intel's Bluetooth Software Stack, 2000, Intel Technology Journal Q2 2000, pp. 1-10.*
Aissi et al., Proposal for Enhancing Bluetooth Security Using an Improved Pairing Mechanism, Apr. 19-23, 2004, Bluetooth Architecture Review Board, pp. 1-25.*

* cited by examiner

*Primary Examiner*—William R Korzuch
*Assistant Examiner*—Michael R Vaughan
(74) *Attorney, Agent, or Firm*—Blakely, Sokoloff, Taylor & Zafman LLP

(57) ABSTRACT

According to one embodiment, a method is disclosed. The method includes generating a link key at a secure component within a first personal area network device and injecting the link key into a protocol stack component database within the first device. The link key may further be transmitted to a second device. Other embodiments are described and claimed.

8 Claims, 5 Drawing Sheets

LINK KEY INJECTION MECHANISM FOR PERSONAL AREA NETWORKS

FIELD OF THE INVENTION

The present invention relates to computer systems; more particularly, the present invention relates to security for personal area networks.

BACKGROUND

Currently, Bluetooth and the emerging (ultra-wide band) UWB are the leading protocols in the market for local, short-range, and personal area networks. However, one of the most challenging aspects of such protocols is weak security. For example, the weakest security point in Bluetooth is the fact that link and encryption keys are derived from a PIN code that a user/operator of Bluetooth coupled devices is expected to physically/manually enter during device-pairing. The PIN code's size ranges from 4 to 16 Octets. Such flexibility usually leads to device-users/operators entering the smallest possible PIN code, which in turn results in weak link and encryption keys.

BRIEF DESCRIPTION OF THE DRAWINGS

The invention is illustrated by way of example and not limitation in the figures of the accompanying drawings, in which like references indicate similar elements, and in which.

DETAILED DESCRIPTION

Figure 1:
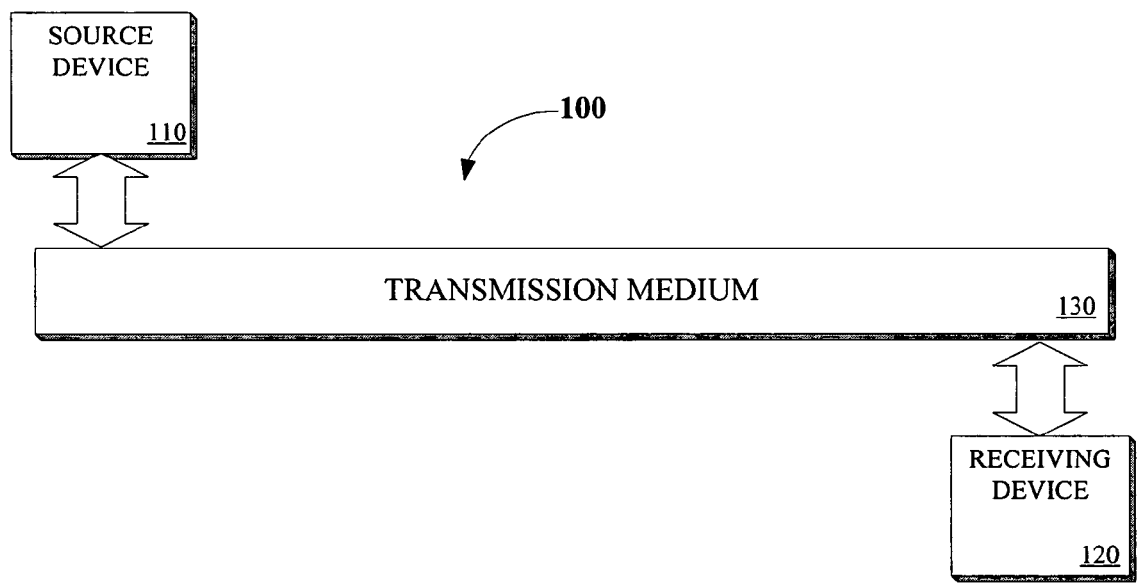
FIG. 1 illustrates one embodiment of a network.

A security method for personal area networks and short range radio systems is described. The method includes pairing two Bluetooth enabled devices. Next, a link key is generated at a first device. A public/private key pair is then generated and the public key is exchanged between the first device and a second device using standard Bluetooth data exchange.

Subsequently, proof of ownership is to be established by having a user prove that the user is the owner of the first device and the second device. The link key is then encrypted and transmitted from the first device to the second device, where it is decrypted. The link key is injected to a database at both the first device and the second device.

In the following detailed description of the present invention, numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), FIG. 1 illustrates one embodiment of a network 100. Network 100 includes a computer system 110 and a computer system 120 coupled via a transmission medium 130. In one embodiment, computer system 110 operates as a source device that transmits data to computer system 120, operating as a receiving device. The data may be, for example, a file, programming data, an executable, voice data, or other digital objects. The data is sent via data transmission medium 130.

According to one embodiment, network 100 is a personal area network, and data transmission medium 130 is implemented as Bluetooth or ultra-wide band (UWB), short range radio, etc. In a further embodiment, computer system 110 may be a personal computer system, while computer system 120 is a wireless handheld device.

Figure 2:
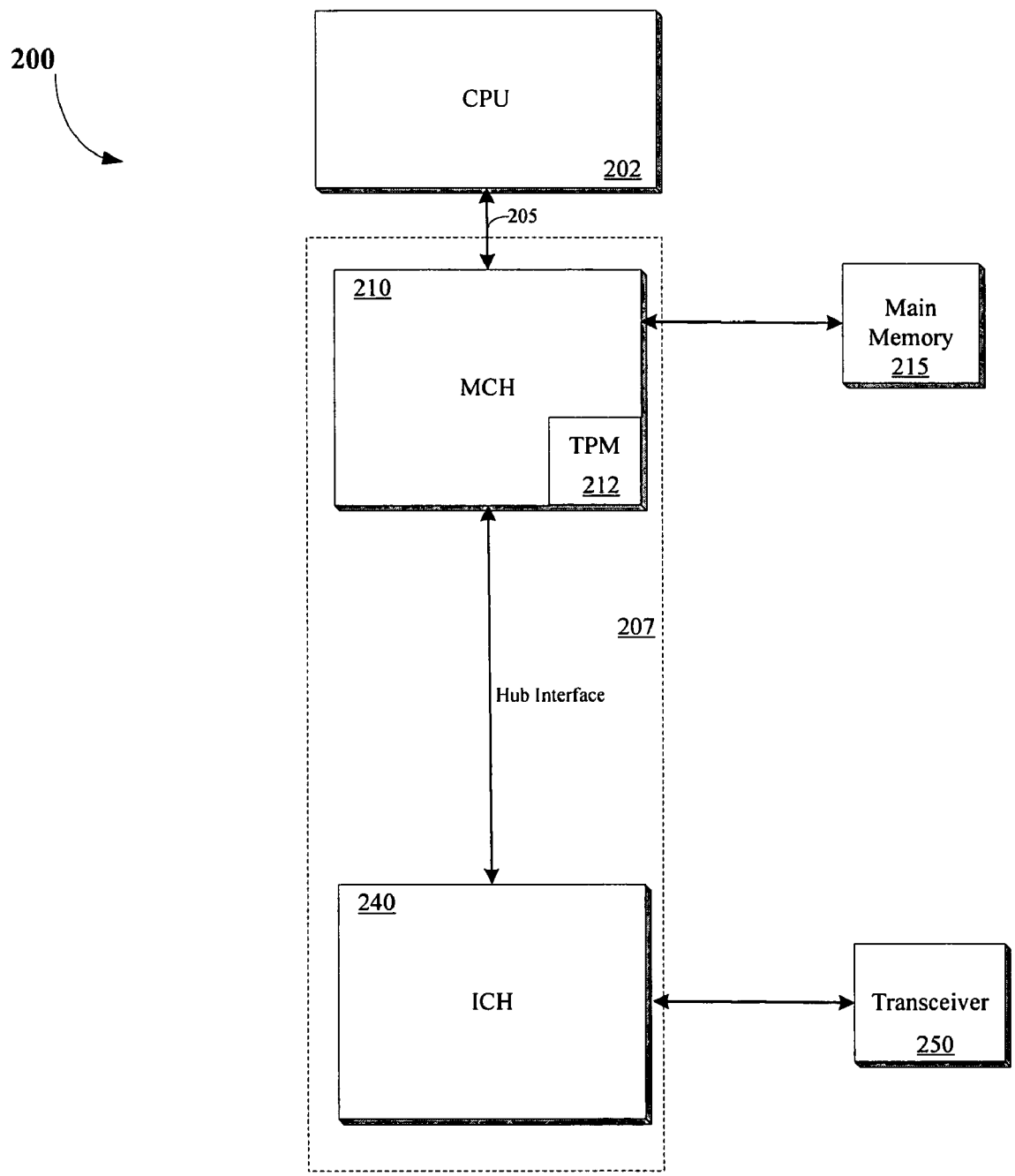
FIG. 2 is a block diagram of one embodiment of a computer system.

FIG. 2 is a block diagram of one embodiment of a computer system 200. Computer system 200 may be implemented as computer system 110 or computer system 120 (both shown in FIG. 1). Computer system 200 includes a central processing unit (CPU) 202 coupled to bus 205. A chipset 207 is also coupled to bus 205. Chipset 207 includes a memory control hub (MCH) 210. MCH 210 may include a memory controller 212 that is coupled to a main system memory 215. Main system memory 215 stores data and sequences of instructions that are executed by CPU 202 or any other device included in system 200.

In one embodiment, main system memory 215 includes dynamic random access memory (DRAM); however, main system memory 215 may be implemented using other memory types. For example, in some embodiments, main system memory 215 may be implemented with a non-volatile memory.

According to one embodiment, MCH 210 also includes a trusted platform module (TPM) 212. TPM 212 includes protected registers 120 that are writable by commands that may only be initiated by trusted microcode in CPU 202. Protected microcode is microcode whose execution may be initiated by authorized instruction(s) and/or by hardware that is not controllable by unauthorized devices. The protected registers may include a register to enable or disable the use of a protected table within main memory 115.

MCH 210 is coupled to an input/output control hub (ICH) 240 via a hub interface. ICH 240 provides an interface to input/output (I/O) devices within computer system 200. For example ICH 240 may be coupled to a transceiver 250. Transceiver 250 facilitates a personal area network between computer system 200 and a remote device. According to one embodiment, transceiver 250 communicates data between computer system 110 and computer system 120 via a Bluetooth interface.

As discussed above, a problem with the Bluetooth interface involves security in the link. The current Bluetooth security model involves a PIN code being used to generate a link key. The link keys are subsequently exchanged and agreed between the devices in the open prior to encryption being enabled. The encryption keys are then derived from link keys. When encryption is used the encryption key is used.

One issue with the current security model is that the PIN size ranges between 4 and 16 digits. However, users typically use the shortest or even default PIN (e.g., 0000). Such PINs can be guessed by a dictionary attack. In addition, a PIN can be sniffed during the pairing process. Another issue is that the link key may be intercepted during key exchange and agreement phase. Further, the strength of encryption is directly tied to PIN length.

Figure 3:
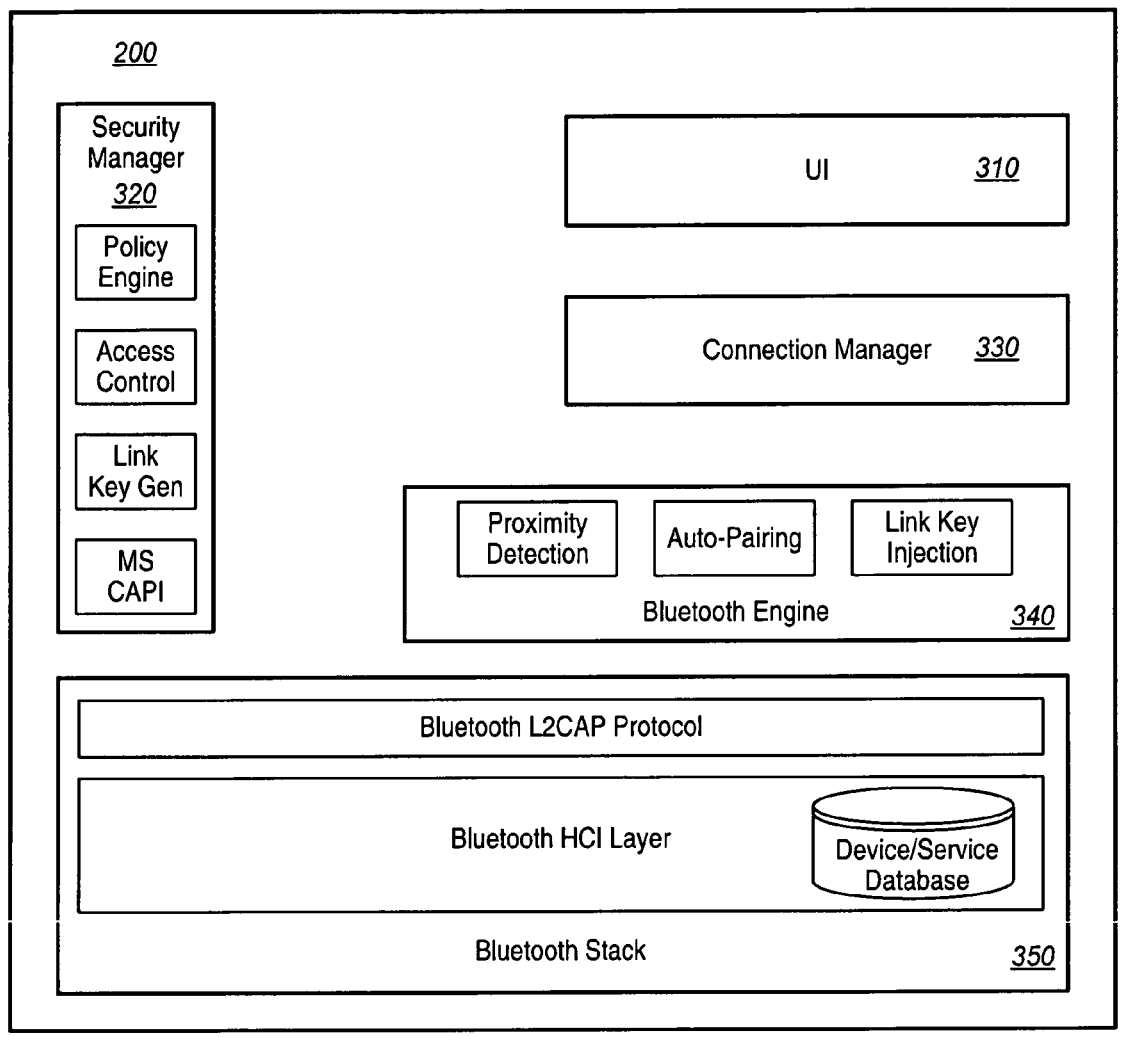
FIG. 3 illustrates another embodiment of a computer system.

According to one embodiment, a secure link key generation and exchange mechanism is provided to generate a link key outside of a Bluetooth stack and to inject the key into the stack. FIG. 3 illustrates one embodiment of modules within computer system 200 implemented to perform link key generation and exchange.

Referring to FIG. 3, computer system 200 includes a user interface (UI) 310, a security manager 320, a connection manager 330, Bluetooth engine 340 and Bluetooth stack 350. UI 310 enables user interaction with computer system 200. Security manager 320 provides security for the Bluetooth interface between devices. For example, security manager 320 includes a link key generator to initiate the generation of a link key, and to store the key once generated.

In one embodiment, the link key is generated at TPM 212. However in another embodiment, the link key is generated using cryptographic software such as Microsoft Cryptographic Application Program Interface (MS CAPI) included within security manager 320. Security manager 320 may also include a policy engine and an access control module, as well as other security modules.

Connection manager 330 manages the interface between two devices coupled via Bluetooth. Bluetooth engine 340 is an application program interface (API) that performs various functions to initiate Bluetooth communication between devices. For instance, Bluetooth engine 340 includes a proximity detection module to detect whether another Bluetooth enabled device is in close proximity to computer system 200.

Further, Bluetooth engine 340 includes an auto-pairing module to pair computer system 200 with a detected device, and a link key injection module to inject a generated link key into a database (not shown) within Bluetooth stack 350. According to one embodiment, the link key is also stored in security manager 320 as discussed above. Bluetooth stack 350 implements a Bluetooth protocol stack, which performs functions such as the Logical Link Control and Adaptation Layer Protocol (L2CAP) and Host Controller Interface (HCI), as well as other functions.

Figure 4:
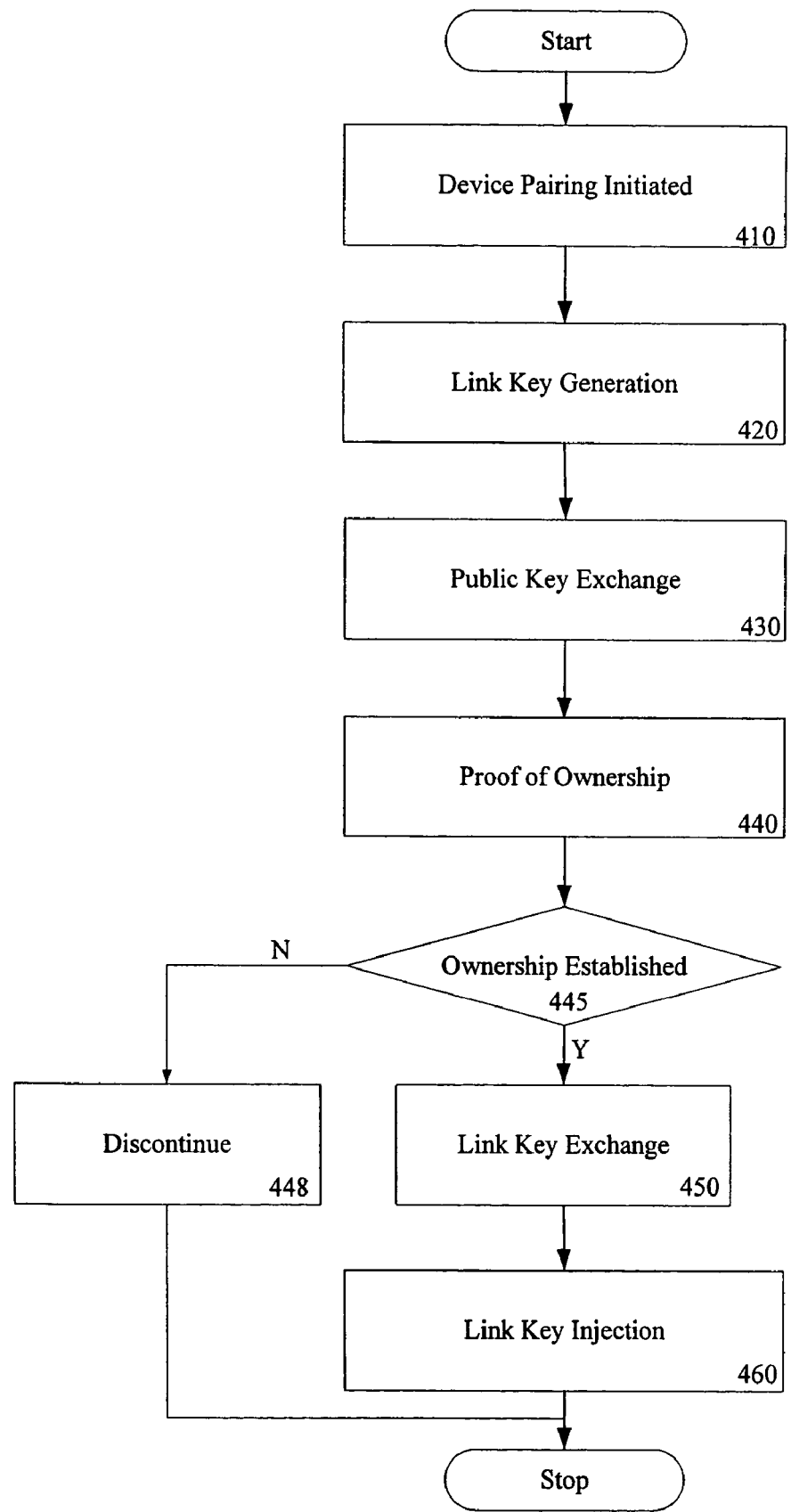
FIG. 4 is a flow diagram for one embodiment for providing security for a Bluetooth link.

FIG. 4 is a flow diagram of one embodiment of providing link key generation and end exchange. At processing block 410, device pairing is initiated at the auto pairing module within Bluetooth engine 340. In one embodiment, the devices to be paired are to be in proximity and in a discoverable mode. Further, unlike the traditional pairing mechanism (e.g., where the PIN code must be physically entered by the user/operator), the pairing devices do not need to be in a secure location during pairing because PIN interception is not a concern.

At processing block 420, link key generation is performed at computer system 200. As discussed above the security manager initiates the generation of the link key either by having a hardware device, such as TPM 212 generate the key, or having the key generated via MS CAPI. In one embodiment, the new link key is a 128 bit key.

After the link key has been generated, the link key is to be provided to the device paired with computer system 200. However, prior to transmitting the link key, the secure transmission of the link is to be ensured. Thus at processing block 430, a public/private key pair is generated and the public key is exchanged using standard Bluetooth data exchange. In one embodiment, the public/private key pair is generated via Rivest, Shamir & Adleman (RSA) public key encryption technology.

At processing block 440, proof of ownership is established. Proof of ownership involves a process of having a user prove that the user owns both devices being paired for Bluetooth connection. In one embodiment, a hash of the public key is displayed on the computer system 200, the device, or both via UI 310. The user is then prompted to select a valid value from a listing of values to prove ownership.

Figure 5:
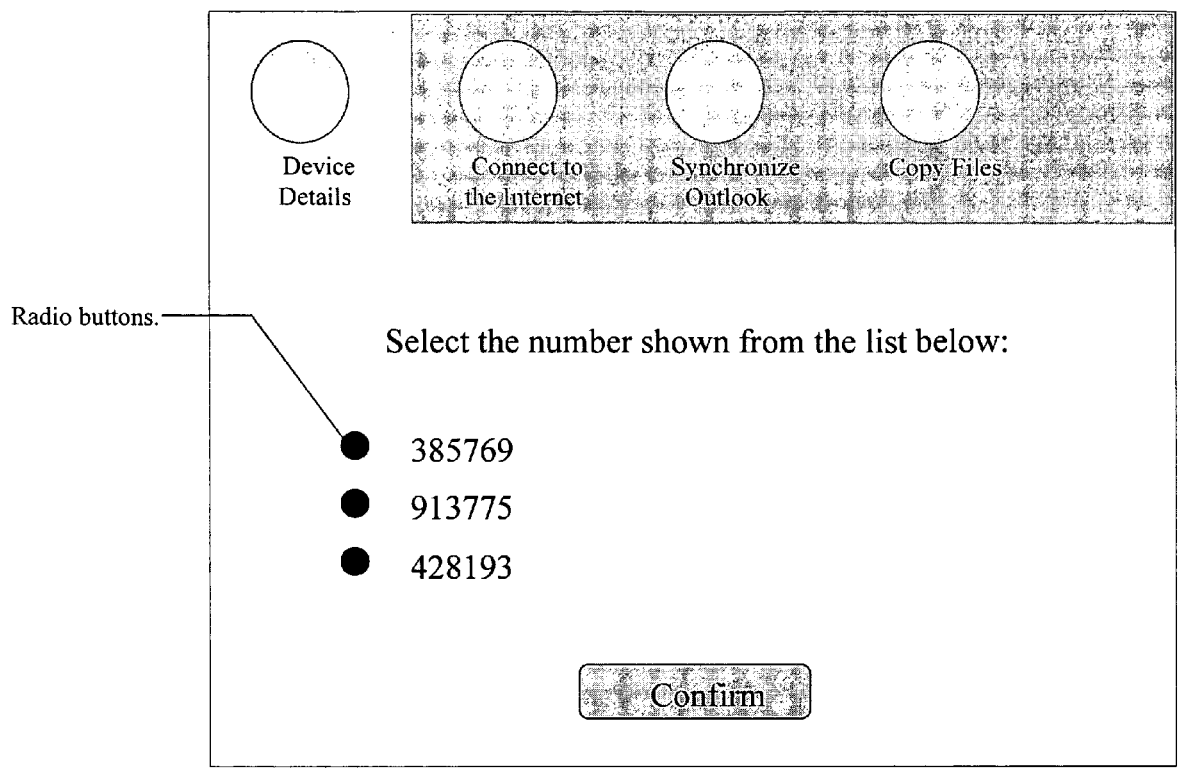
FIG. 5 illustrates one embodiment of a user interface screenshot.

For example, UI 310 may display three sets of 6 digit numbers, where only one is correct (e.g., derived from the public keys, and the other two are random). The user is then prompted to select the correct signature on one or both of computer system 200 or the device. FIG. 5 illustrates one embodiment of a display, at either computer system 200 or the paired device, requesting proof of ownership.

Referring back to FIG. 4, at decision block 445 it is determined whether the user has selected the correct value. If an incorrect value is selected by the user, the authentication fails and the user is informed via UI 310 that the process will be discontinued, processing block 448. Otherwise, link key exchange is performed at processing block 450. In one embodiment, the link key is signed at computer system 200 using the private key of computer system 200 and encrypted using the public key of the device. Subsequently, the encrypted link key is transmitted to the device. Upon receiving the encrypted link key, the link key is decrypted using the private key of the device. The signature is then verified. At processing block 460, the link key is injected to a HCI key database at both computer system 200 and the device.

The above-described link key mechanism replaces the use of PIN codes to enhance the security as well as usability of Devices based on Short-Range Radio and Personal Area Networks. Further, the mechanism discloses the use of hardware-based cryptographic capabilities to generate link keys for Short-Range Radio communication.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method of establishing a link key for use in a personal area network comprising:
   generating a link key with a trusted platform module (TPM) in a first personal area network device, wherein the TPM is only accessible via trusted microcode;
   injecting the link key into a protocol stack component database within the first personal area network device;
   establishing proof of ownership of the first personal area network device and a second personal area network device prior to transmitting the link key by performing a hash of a public key, displaying the hash value, prompting a user to select a valid value from a displayed list of values including at least one invalid value; and
   transmitting the link key from the first personal area network device to the second personal area network device using a public/private key pair in response to selection of the valid value.

2. The method of claim 1 further comprising receiving the public key from the second personal area network device prior to transmitting the link key.

3. The method of claim 2 further comprising encrypting the link key with the public key received from the second personal area network device.

4. The method of claim 1 wherein the secure component is a software component.

5. The method of claim 1 wherein the secure component is a hardware component.

6. An article of manufacture including one or more non-transitory computer readable media that embody a program of instructions to establish a link key for use in a personal area network, wherein the program of instructions, when executed by a processing unit, causes the processing unit to perform the process of:
   generate a link key with a trusted platform module (TPM) in a first personal area network device, wherein the TPM is only accessible via trusted microcode;
   inject the link key into a protocol stack component database within the first personal area network device;
   establish proof of ownership of the first personal area network device and a second personal area network device prior to transmitting the link key by performing a hash of a public key, displaying the hash value, prompting a user to select a valid value from a displayed list of values including at least one invalid value; and
   transmit the link key from the first personal area network device to the second personal area network device using a public/private key pair in response to selection of the valid value.

7. The article of manufacture of claim 6 wherein the program of instructions, when executed by a processing unit, further causes the processing unit to perform the process of receiving the public key from the second personal area network device prior to transmitting the link key.

8. The article of manufacture of claim 7 wherein the program of instructions, when executed by a processing unit, further causes the processing unit to perform the process of encrypting the link key with the public key received from the second personal area network device.

* * * * *